US006003859A

United States Patent [19]

Reist

[11] Patent Number: 6,003,859

[45] Date of Patent: Dec. 21, 1999

[54] APPARATUS FOR SUPPLYING PRINTED PRODUCTS TO PROCESSING STATIONS

[75] Inventor: Walter Reist, Hinwil, Switzerland

[73] Assignee: Ferag AG, Hinwil, Switzerland

[21] Appl. No.: 09/229,189

[22] Filed: Jan. 13, 1999

Related U.S. Application Data

[63] Continuation of application No. PCT/CH97/00192, May 16, 1997.

[51] Int. Cl.[6] .......................... B65H 29/04; B65H 29/06; B65G 1/00; B65G 49/00

[52] U.S. Cl. .......................... 271/204; 271/82; 271/201; 198/347.1; 198/644

[58] Field of Search .......................... 198/644, 367.1, 198/347.1, 359, 360, 468.2, 468.3, 347.4; 270/52.14, 52.16, 52.29; 271/204, 3.19, 3.18, 3.24, 301, 303, 82, 201

[56] References Cited

U.S. PATENT DOCUMENTS

| | | | |
|---|---|---|---|
| 3,032,341 | 12/1962 | Reist | 271/79 |
| 3,123,888 | 3/1964 | Meyers | 28/1 |
| 3,907,274 | 9/1975 | D'Aamato et al. | 271/64 |
| 4,039,182 | 8/1977 | Reist et al. | 271/64 |
| 4,399,905 | 8/1983 | Lance et al. | 198/422 X |
| 4,438,618 | 3/1984 | Honegger | 53/430 |
| 4,565,130 | 1/1986 | Lew | 101/240 X |
| 4,743,005 | 5/1988 | Reist | 270/55 X |
| 4,887,809 | 12/1989 | Eberle | 271/203 |
| 4,917,369 | 4/1990 | Moll et al. | 271/228 X |
| 5,007,624 | 4/1991 | Chandhoke | 270/52 |
| 5,072,822 | 12/1991 | Smith | 198/349 X |
| 5,421,257 | 6/1995 | Okuda et al. | 101/137 X |
| 5,503,264 | 4/1996 | Eberle | 198/803.01 |
| 5,506,599 | 4/1996 | Curley et al. | 271/270 X |
| 5,908,116 | 6/1999 | Levaro et al. | 209/584 X |

*Primary Examiner*—William E. Terrell
*Assistant Examiner*—Kenneth W Bower
*Attorney, Agent, or Firm*—Brinks Hofer Gilson & Lione

[57] ABSTRACT

A conveyor (10) has a self-contained main conveyor line (12), a number of feed lines (14, 14') in the form of buffer lines and a return line (16, 16'). Each feed line (14, 14') is associated to a processing station (26, 26'). The feed lines (14, 14') are connected to the main conveyor line (12) by means of controlled switches (28) so that, viewed in the conveyor direction (F), any of the clamps (20) can be delivered to any desired processing station (26). This gives the device great flexibility and decouples the processing stations from the pickup of the pressroom products at the pickup station (24).

26 Claims, 4 Drawing Sheets

APPARATUS FOR SUPPLYING PRINTED PRODUCTS TO PROCESSING STATIONS

This application is a continuation of PCT/CH97/00192 filed May 16, 1997.

The present invention relates to an apparatus for supplying printed products to at least two processing stations intended for processing printed products. The apparatus includes at least one main conveying path, a plurality of processing stations, a plurality of feed paths, a plurality of return paths and a plurality of clamps. The invention also relates to an apparatus for supplying printed products to a processing station designed for collection purposes. This apparatus includes a feed path along which clamps, with their mouth directed downward, can be moved in order to feed the folded printed products in a hanging position and with the fold located at the bottom.

In the present context, the term "processing stations" is intended to mean primarily in each case a machine unit which combines printed products, fed via an upstream feed path, to form a finished product, or inserts a supplement into each of the printed products, or stacks, ties and/or straps the printed products or addresses them or cuts them to format. Processing station is also intended to mean a conveying station to which printed products are to be fed. This further processing can take place either continuously or discontinuously. Accordingly, the feed paths arranged upstream of such processing stations have to be designed to be capable of feeding the printed products to the processing station continuously or discontinuously. It is often the case that the capacity of such a processing station is not appropriate for the capacity of an upstream printed-product source, be this a printing press, an unwinding station or the like or the conveyor following the same, and/or there is a desire to feed some parts of the production to one specific further processing operation and other parts of the same production to another further processing operation. In both cases, the production thus has to be divided up.

An apparatus suitable for this purpose is disclosed, for example, in EP-A-0 272 398 and in the corresponding U.S. Pat. No. 4,866,910. Individual overhead conveyors which are driven endlessly in circulation and are provided with spaced-apart controllable grippers, which each grip a printed product at its leading edge, as seen in the conveying direction, are arranged such that they intersect the feed paths arranged upstream of the processing stations. In order for the continuously arriving streams of printed products to be divided up as continuously as possible, and in order for it to be possible for this process to be adapted in optimum fashion to the requirements of the processing stations, the streams are fed to a store at the points of intersection, while, at the same point of intersection, printed products are simultaneously transferred out of the store to the feed paths via a transfer location. For this purpose, a storage device with two winding cores which can be driven individually and independently of one another is arranged at each point of intersection, in each case one of the winding cores being aligned in accordance with the relevant individual conveyor and the other of the winding cores being aligned in accordance with the transfer location. These storage devices maintain the formation of the arriving stream and the stream stored in this way is transferred to the associated feed paths, by said storage devices, in the same formation. In the region of each point of intersection, this known apparatus thus has something of an intermediate store which is always filled up and is simultaneously reduced, it being the case that the reduction takes place irrespective of the quantity delivered by the stream and can thus be adapted to the requirements of the following processing station.

In addition to the large amount of space it takes up and the high outlay in terms of equipment, this known apparatus is restricted in terms of flexibility. Its strength lies in the possibility of providing an intermediate store for a large number of the continuously arriving, successive printed products. It is not particularly suitable, if at all, for the individual processing of individual printed products or of a small number of the printed products arriving.

A further apparatus for dividing up onto a plurality of processing stations an arriving stream of printed products is disclosed in CH Patent no. 382 768 and in the corresponding U.S. Pat. No. 3,032,341. This apparatus has mutually independent grippers which circulate on a rail. In order to divide up the production, the rail is divided up into two strands, which form feed paths, every second clamp with a printed product being fed to one strand and the rest being fed to the other strand. Each of these strands may be divided up further if required, as long as the printed products arriving on the individual strands are appropriate for the work which is to be carried out. This apparatus makes it possible for slow operations to be carried out simultaneously at a plurality of processing stations. It has the disadvantage, however, that the entire system has to be brought to a standstill if one station is at a standstill and the strand leading to it is provided with clamps.

The object of the present invention is thus to provide an apparatus of the generic type which has increased flexibility.

This object is achieved by an apparatus of the generic type which has at least one main conveying path having a control diverter at a transfer location that functions to divert the clamps with retained printed products to a feed path, each feed path leading to a processing station, each feed path including a storage device for the intermediate storage of printed products. The feed paths function as buffer-storage paths in which, for intermediate storage, successive clamps can assume a minimal spacing from one another or can butt against one another, and the feed paths are adjoined by return paths for the clamps which have been emptied at the processing stations to be directed back to the main conveying path.

The printed products are each transported in a state in which they are retained by a clamp. Since the clamps are independent of one another, they can be directed individually to each of the desired feed path [sic] by means of controlled diverters. The printed products are thus transported to the processing station by means of the clamps and are discharged to said station by virtue of the clamp being opened. It is not necessary for the printed products to be transferred from the clamps to a different conveyor. Since the feed paths are designed as buffer-storage paths, this allows for variations in the arrival and transfer of the printed products to each feed path.

A particularly preferred embodiment of the inventive apparatus includes a main conveying path that comprises a continuous conveyor and a diverter for each feed path. This arrangement increases the flexibility still further by it being possible for clamps and/or printed products to be directed past the feed paths.

Since the clamps are independent of one another, and thus adjacent clamps can assume different spacings from one another, it is possible for them to be restrained at any desired locations and discharged in a controlled manner. A special embodiment of the apparatus includes a release device in the main conveying path which releases the clamps at a location upstream of the diverters at a given points in time. This ensures in a straightforward manner that the diverters can be changed over without there being any risk of clamps being jammed or guided incorrectly.

A further preferred embodiment of the apparatus according to the invention includes a second main conveying path which is connected, via a connecting path and additional controlled diverters, for the purpose of transferring clamps provided with printed products from the second main conveying path into the first main conveying path makes possible the introduction of printed products from a different production process or printed-product source.

In a particularly preferred embodiment of the inventive apparatus the diverters are arranged in a section of the main conveying path that slopes downward in the conveying direction and the feed paths slope downward toward the processing stations. In an apparatus of this type, it is possible for a motor drive of the clamps to be dispensed with in the region of the diverters and feed paths, thus allowing a particularly straightforward design.

The embodiment of the inventive apparatus in which the feed paths run above the processing stations and the mouths of the clamps are directed downward, permits straightforward introduction, ejection and buffer storage of the printed products, these operations not harming the printed products in any way, as well as straightforward transfer to the processing stations.

Particularly straightforward discharge of the printed products from the clamps to the processing paths of the processing stations is achieved by an embodiment of the inventive apparatus in which the processing stations collect, collate or insert the printed products. This embodiment of the invention further include stationary processing paths for the discharge of the printed products to the processing paths.

A further preferred embodiment of the inventive apparatus includes a feed path, for the transfer of the printed products to the processing paths, that runs in a vertical plane and slopes downward to the processing paths allows continuous transfer of the printed products to the processing paths.

A particularly preferred embodiment of the inventive apparatus for the collection of the printed products is for use when the printed products comprise folded printed products, and said processing paths comprise collecting paths which further comprise saddle-like rests. The clamps retain the folded printed products at their fold, and one stationary opening lug is arranged between the feed paths and the rests. An opening lug, for separating the two product parts that are connected by the fold and for directing the side of the other product parts, which have thus been lifted off from one another.

The embodiment of the inventive apparatus having feed paths that run transversely with respect to the vertical plane and slope downward and include a controlled stop device against which the clamps are positioned for the discharge of the printed products allows the timed discharge of the printed products to the processing stations and provides for reliable transfer.

The apparatus in which the feed paths run transversely with respect to a vertical plane and slope downward and each feed path includes a controlled stop device against which the clamps are positioned for the discharge of the printed products defines a particularly preferred embodiment of the inventive apparatus for the opening and collection of the printed products.

The embodiment having a feed path along which clamps, with their mouth directed downward, can be moved in order to feed the folded printed products in a hanging position and with the fold located at the bottom, is a preferred apparatus for the collection of printed products.

The present invention will now be explained in more detail with reference to exemplary embodiments illustrated in the drawing, in which, purely schematically:

Figure 1:
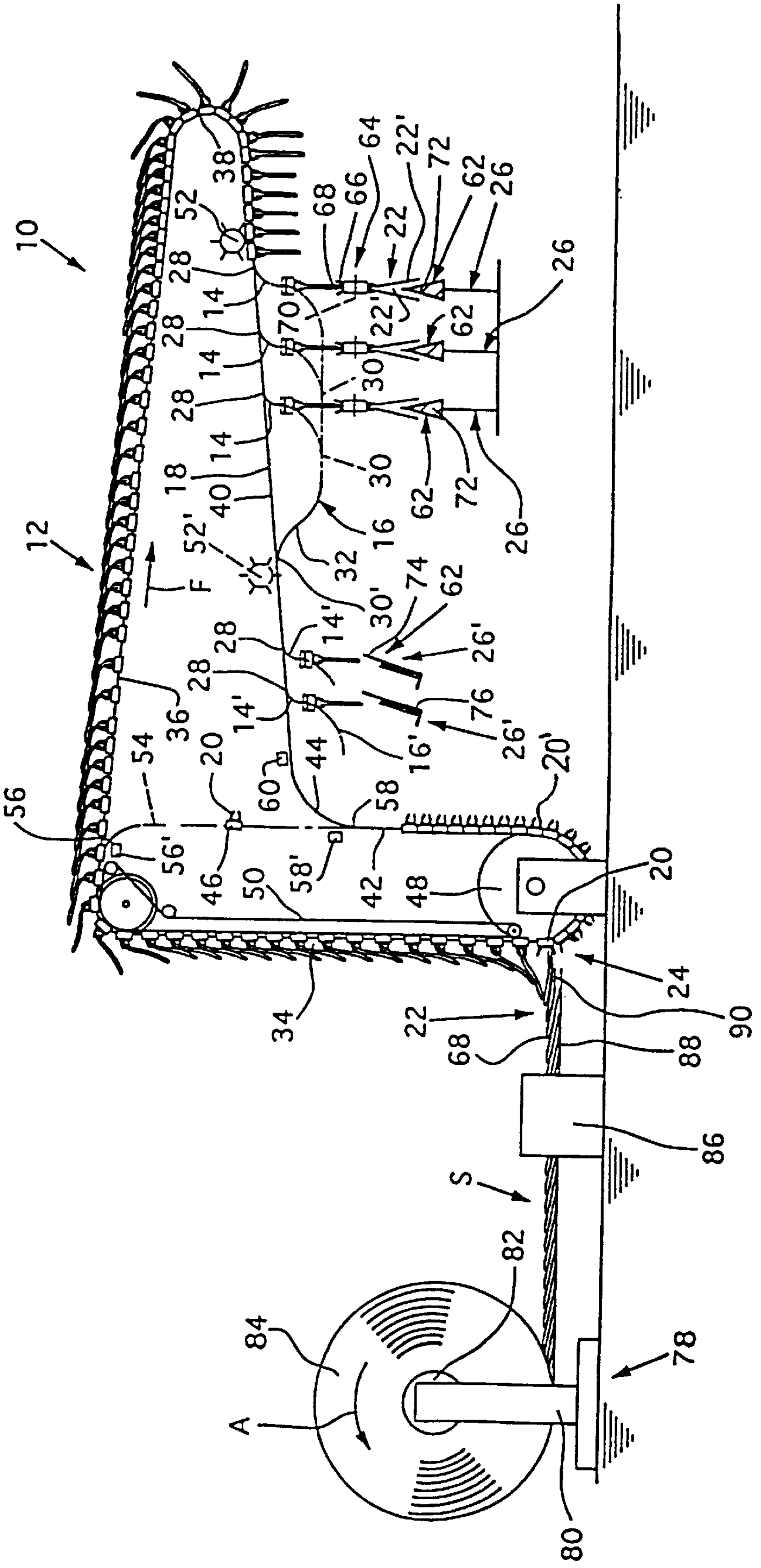
FIG. 1 shows an embodiment of the apparatus according to the invention with a continuous main conveying path and diverters for individually directing from the main conveying path to the desired processing station the printed products retained by clamps.

The apparatus shown in FIG. 1 has a conveying means 10 with a continuous main conveying path 12, a plurality of feed paths 14, 14' and return paths 16, 16'. These paths 12, 14, 14', 16, 16' are formed by rails 18 along which individual clamps 20 for transporting printed products 22, such as newspapers, periodicals or parts thereof, can be moved in the conveying direction F from a receiving location 24 to processing stations 26, 26' assigned to the feed paths 14, 14', and then on to the receiving location 24 again. The main conveying path 12 is connected to each of the feed paths 14, 14' via a diverter 28, with the result that, as seen in the conveying direction F, each of the clamps 20 can be redirected from the main conveying path 12 into the desired feed path 14, 14'. The feed paths 14, 14' are adjoined directly by the return paths 16, 16', which, as is shown with reference to the return paths 16 adjoining the feed paths 14, combine, via diverters 30, to form a return strand 32, which is connected at the downstream end to the main conveying path 12 by means of a diverter 30'. In the same way, the return paths 16' adjoining the feed paths 14' may be combined to form a strand or connected individually to the main conveying path 12 via a corresponding diverter.

The main conveying path 12 has a vertical section 34, in the bottom end region of which the receiving location 24 is arranged. The top end of the vertical section 34 is adjoined by a first downwardly sloping section 36, which is followed, after a curved section 38, by a second downwardly sloping section 40, which runs counter to the first downwardly sloping section 36. The second downwardly sloping section 40 passes into a vertical section 42 which, via an arc section 44, leads to the bottom end of the vertical section 34. The feed paths 14, 14' and the return paths 16, 16' are located in the same plane as the second downwardly sloping section 40, with the result that the clamps 20 can move in the conveying direction F to the arc section 44, from the top end of the vertical section 34, as a result of their gravitational force.

Each of the clamps 20 is fastened on a carriage 46, which can be moved freely along the rails 18. The carriages 46 have carry-along protrusions (not shown) which, for the purpose of moving the clamps 20 in the arc section 44 and in the vertical section 34, interact with a drive wheel 48 and a drive belt 50, which is driven in circulation in the conveying direction F.

Upstream of the diverters 28, the main conveying path 12 is assigned an access-lock-like timing wheel 52 which is intended for releasing in each case one clamp 20 at certain points in time. The first downwardly sloping section 36, the curved section 38 and that part of the second downwardly sloping section 40 which is located upstream of the timing wheel 52 form an accumulation path for the clamps 20. As is indicated by chain-dotted lines, a further timing wheel 52' may be provided between the diverters 28 assigned to the feed paths 14 and to the feed paths 14'.

Furthermore, the first downwardly sloping section 36 is connected to the vertical section 42 by way of a bypassing section 54 (indicated by chain-dotted lines). Arranged at the diverter 56, which connects the first downwardly sloping section 36 to the bypassing section 54, is a sensor-actuator unit 56' which is intended for setting the diverters such that clamps 20 provided with printed products 22 remain in the main conveying path 12 and clamps 20 without printed products 22 are fed to the bypassing section 54, as is indicated with reference to one clamp 20. Arranged at the inlet of the bypassing section 54 into the vertical section 42 is, once again, a diverter 58, of which the actuator 58' is actuated, in dependence on the sensor-actuator unit 56', in order to ensure that the clamp 20 located in the bypassing section 54 is directed into the vertical section 42. Upstream of the diverter 58, the second downwardly sloping section 40 is assigned a stop element 60 which, in dependence on the position of the diverter 58, restrains clamps 20 arriving at the end of the second downwardly sloping section 40, if the diverter 58 is set to direct clamps 20 into the vertical section 42 from the bypassing section 54, and releases said first-mentioned clamps, as soon as the diverter 58 has been changed over again, and allows the clamps to pass through.

Each of the feed paths 14, 14' is assigned a processing station 26, 26', respectively. Each of the processing stations 26 has a stationary processing path 62 which is arranged beneath the relevant feed path 14, is designed as a collecting path and is intended for receiving in a straddling manner the folded printed products 22 fed to it and for transporting said printed products in the longitudinal direction of the processing path 62, with the result that further conveying means 10 can deposit further printed products on the printed products deposited. In this context, "stationary" means that the processing path is fixed in the direction transverse with respect to its longitudinal direction.

Arranged between each processing path 62 and the corresponding feed path 14 is an opening device 64, which will be described in more detail in conjunction with FIGS. 2 and 3. All that need be mentioned for the time being is that it has rotating grippers 66 which are intended for gripping at the bottom fold 68 in each case one folded printed product 22, which is fed in a hanging position by means of a clamp 20, rotating it about a horizontal axis 70 and releasing the printed product 22, which is opened during this rotation, with the result that each of the two product parts 22', which are connected to one another at the fold 68, comes to lie on one side of the rest 72 of the processing path 62.

The work stations 26' are designed for the collation and/or insertion of printed products. They each have a stationary processing path 62 which runs beneath the relevant feed path 14', is designed as a collation and/or insertion path 74 and has a receiving part 76. The printed products 22, which are fed by means of clamps 20 and are transferred to the receiving parts 76 by virtue of the clamps 20 being opened, are transported in the longitudinal direction of the collation and/or insertion path 74 in the relevant receiving part 76, with the result that, by means of a further conveying means 10, further printed products can be deposited congruently on the printed products already deposited or can be inserted into printed products which have already been deposited and opened.

Each of the feed paths 14, 14' is designed as a buffer-storage path, i.e. it has a certain length in order to be able to receive a number of clamps 20 provided with printed products 20 [sic].

FIG. 1 also shows an unwinding device, known in general terms, with a winding core 82 mounted on the winding framework 80. Said core bears a roll 84 comprising a large number of printed products 22, which are wound up in imbricated formation together with a winding band, which is subjected to tensile stressing. As a result of rotation in the arrow direction A, the printed products 22 are unwound in imbricated formation S from the roll 84 and directed to the receiving location 24. In the imbricated formation S, as seen in the unwinding direction A, each printed product 22 rests on the respectively following printed product and a border 90, which is located opposite the fold 68 and constitutes the so-called bloom, leads in relation to the fold 68. A device which is designated by 86 and is disclosed, for example, in CH Patent Application no. 1996 1146/96 ensures that the printed products 22 fed to the receiving location 24 have a certain imbricated-formation spacing, which is greater than the depth of the clamps 20, and prevents two printed products 22 from being located congruently one above the other.

The drive wheel 48 is driven synchronously with the belt conveyor 88, which conveys the printed products 22 from the device 86 to the receiving location 24. These measures ensure that each clamp 20 is fed a single printed product 22.

Figure 2:
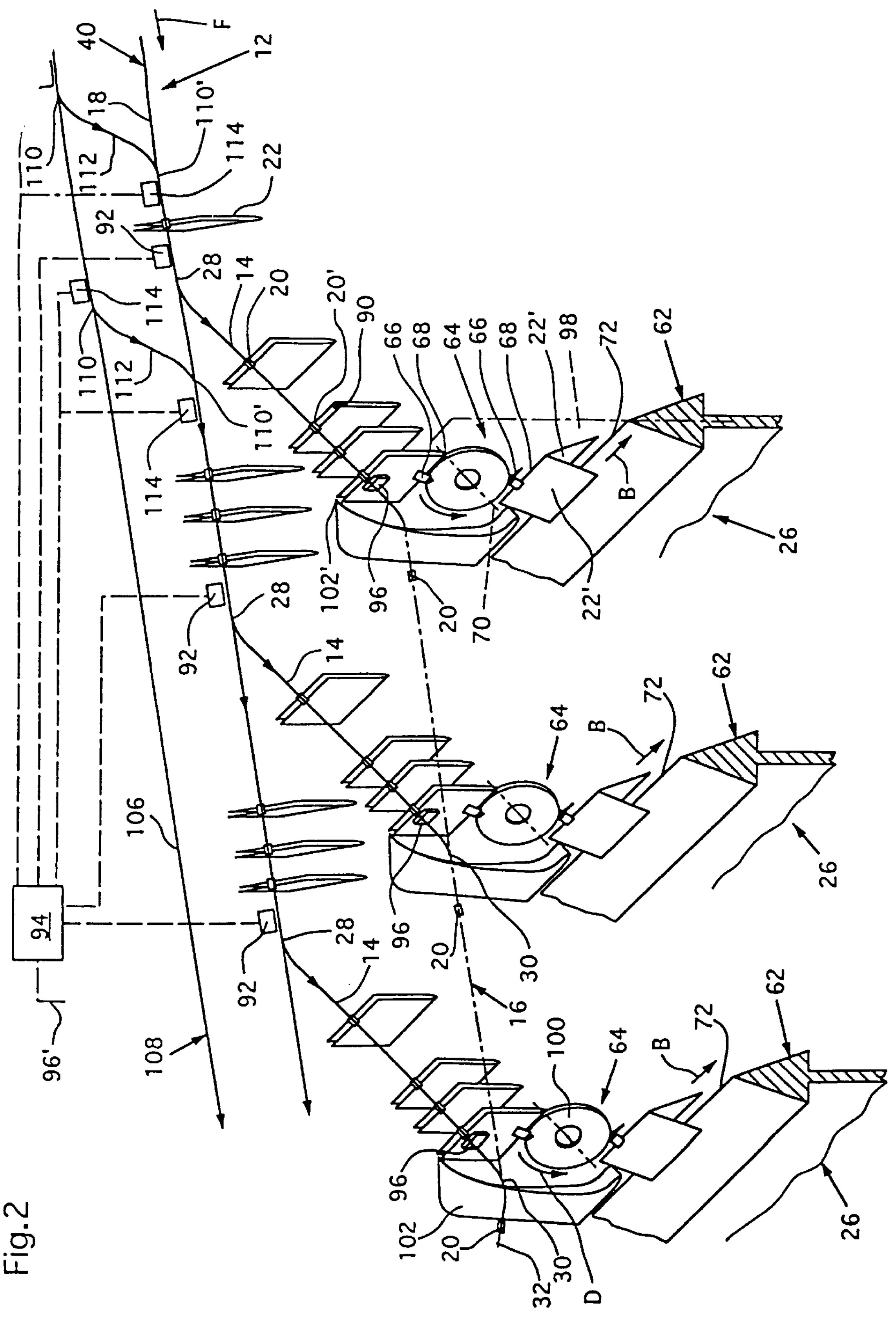
FIG. 2 shows a perspective view of part of the apparatus shown in FIG. 1, with an additional main conveying path.
Figure 3:
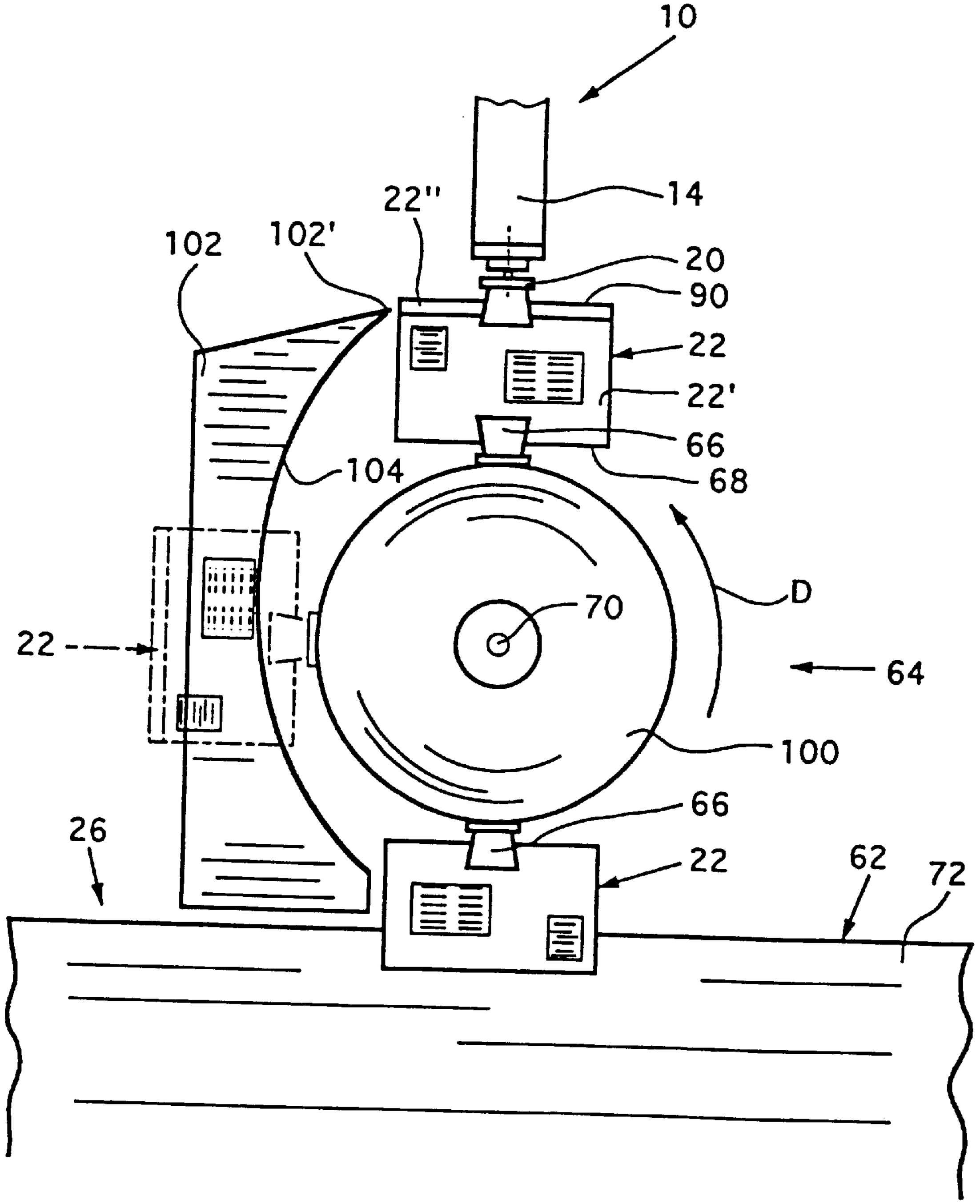
FIG. 3 shows, on an enlarged scale, a view of part of the apparatus shown in FIGS. 1 and 2, in the transfer region of the printed products from the clamps to a processing station.

FIG. 2 shows part of the second downwardly sloping section 40 with the diverters 28, and also shows the adjoining feed sections 14 and parts of the processing stations 26 assigned to these feed sections. Those parts of the conveying means 10 and processing stations 26 which correspond to FIG. 1 are provided with the same designations as in FIG. 1 and are only mentioned again if this is necessary for understanding FIG. 2.

As is indicated by dashed lines, the actuator units 92 of the diverters 28 are connected to a control device 94. The latter is also connected, as is indicated by the line 96', to a stop device 96, assigned to each feed path 14, 14', and also to the rest of the sensor-actuator units 56', 58', stop elements 60 and drives for timing wheels 52, 52' shown in FIG. 1.

The stop devices 96 are arranged such that the mouths 20' of the clamps 20 positioned against them are located in a vertical plane 98 defined by the longitudinal extent of the relevant processing paths 62. The feed paths 14 slope downward to the stop device 96 in a further vertical plane, which is at right-angles to the vertical plane 98. By way of their downwardly directed mouths 20', the clamps 20 retain the printed products 22 in a hanging position at their top bloom 90.

As can be seen from FIG. 2, the independence of the clamps 20 and the individual control of each of the diverters 28 mean that in each case individual printed products 22 or a plurality of successive printed products 22 can be directed to any desired feed path 14. The feed paths 14 form buffer-storage paths between the diverters 28 and the stop devices 96. The feed of printed products 22 into the feed paths 14 is controlled such that the processing stations 26 can operate optimally and without interruption.

The two grippers 66 of each opening device 64 are arranged, on a wheel-like carrier 100, diametrically opposite one another in relation to the axis of rotation 70 of said carrier. The axis of rotation 70 runs at right-angles to the vertical plane 98. In time with the associated processing stations 26, the carriers 100 are driven in rotation in each case through 180° in the arrow direction D. As can also be seen, in particular, from FIG. 3, each opening device 64 also has a stationary opening lug 102, which is likewise arranged at least approximately in the vertical plane 98. The top insertion tip 102' of the opening lug 102 is located, in the case of a clamp 20 being positioned against the stop device 96, at a small spacing from the side edge of the relevant printed product 22 and from the top bloom 90. The printed products 22 are preferably folded eccentrically, with the result that one product part 22' has a border region 22" projecting beyond the other product part 22'. This easily ensures that the opening lug 102 is inserted between the two product parts 22' and the printed products 22 are opened centrally. The border 104 of the opening lug, said border being directed toward the carrier 100, approaches the carrier 100, starting from the insertion tip 102' and then runs approximately coaxially to said carrier, at a spacing therefrom, into the vicinity of the rest 72. As seen in the longitudinal direction of the rest 72, the border 104 is in the form of an acute triangle with the vertex located at the insertion tip 102', as can be seen, in particular, from FIG. 2. A printed product 22 gripped at the fold 68 by a gripper 66 is released by the relevant clamp 20, positioned against the stop device 96, and carried along in the direction of rotation D by the carrier 100. In this case, the opening lug 102 is inserted, by way of the insertion tip 102', between the two product parts 22', which are increasingly lifted off from one another as rotation continues, with the result that finally, after a rotation through 180° guided by the opening lug 102, the two product parts 22' each come to lie on one side of the rest 72. The opening of the gripper 66 then causes the open printed product 22 to drop in a straddling manner onto the rest 72, where it is conveyed further in the arrow direction B, for example, by means of protrusions.

As soon as the clamp 20 positioned against the stop device 96 has released the printed product 22 and the gripper 66 has rotated the printed product through approximately 90° (see FIG. 3, printed product indicated by chain-dotted lines), the stop device 96 releases the clamp 20 and then stops the immediately following clamp 20, as a result of which the next printed product 22 is ready to be received by a gripper 66.

It is also conceivable for the feed paths 14 to run in vertical planes which are oblique with respect to the vertical planes 98 defined by the collecting paths 62. In this case, the clamp mouths 20' are positioned obliquely with respect to the rail direction, with the result that, in the case of clamps 20 positioned against the stop devices 96, the printed products 22 are in turn arranged essentially in the vertical plane 98. It is also conceivable for the clamps 22 to be arranged rotatably on the carriages, with the result that with the rails being routed in any desired direction, in the region of the feed path 14, the printed products 22 can be aligned parallel to the vertical plane 92 [sic].

FIG. 2 also shows a downwardly sloping section 106 of a second main conveying path 108. The second main conveying path 108 has two further diverters 110, which are adjoined by the connecting paths 112 which, via further diverters 110', open out into the second downwardly sloping section 40, on the one hand, upstream of the first diverter 28, as seen in the conveying direction F, and, on the other hand, between the first and second diverters 28. It is, of course, conceivable for the second main conveying path 108 to be connected to the first main conveying path 12 via further connecting paths. These connecting paths 112 with the associated further diverters 110, 110' make it possible to introduce printed products 22 between printed products 22 transported by the first main conveyor path 12. In order to allow straightforward introduction, the actuators 114 of the further diverters 110 and 110' are, in turn, connected to the control device 94, it being the case that the diverters 110 and 110' assigned to a connecting path 112 are each simultaneously set to branching or non-branching.

Figure 4:
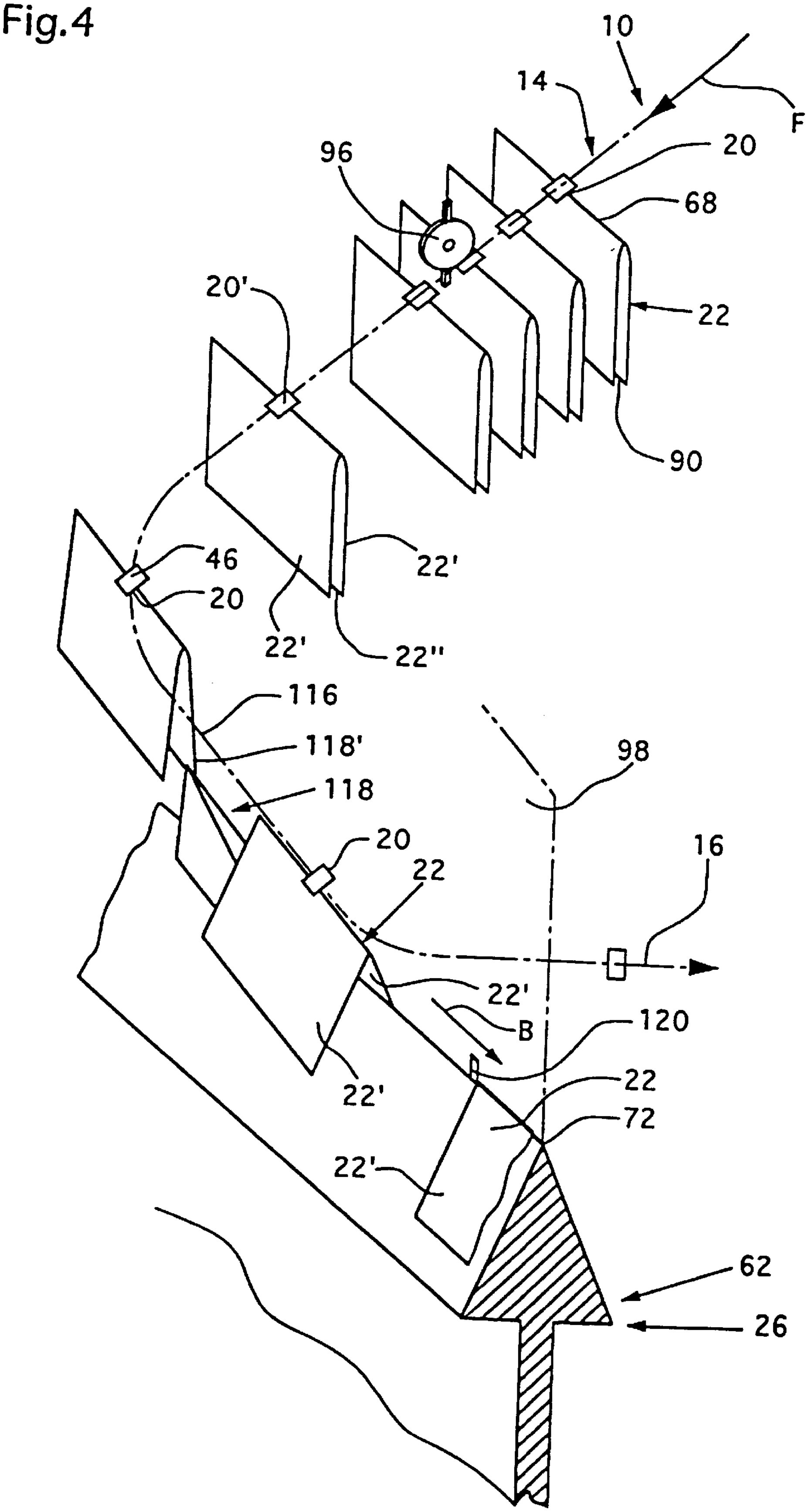
FIG. 4 shows a perspective view of a further embodiment of the apparatus according to the invention in the transfer region of the printed products to the processing station.

The feed path 14 shown in FIG. 4 has a rectilinear opening and depositing section 116 which, as seen in the conveying direction F, slopes down in the vertical plane 98 defined by the processing path 62. A stationary opening lug 118 is arranged between said opening and depositing section 116 and the rest 72, which runs horizontally beneath said section 116. The clamps 20 are designed rotatably with respect to their carriages 46. In that section of the feed path 14 which runs as buffer-storage path upstream of the stop device 96, the clamps 20 are aligned such that the downwardly directed mouths 20' run essentially at right-angles to the conveying direction F. This achieves a high storage density in the buffer-storage path. Downstream of the stop device 96, the rail runs around a curve into the opening and depositing section 116. In the region of this curve, the clamps 20, controlled for example via guide means, are rotated with respect to the carriages 46 such that, in the opening and depositing section 116, the clamp mouths 20' run in the conveying direction F and thus in the plane 98. The clamps 20 are further intended for retaining the printed products 22 in a hanging position at their fold 68, with the result that the bloom 90 is located at the bottom. The eccentric folding of the printed products 22 means that, again, one product part 22' has a border section 22" which projects beyond the other product part 22 [sic] and then comes to butt against the insertion tip 118' of the opening lug 118, said insertion tip being directed counter to the conveying direction F, with the result that the opening lug is inserted centrally into the printed product 22, between the product parts 22', when a printed product 22 is moved along the opening and depositing section 116. Since, as seen in plan view, the opening lug 118 widens in the conveying direction F, the two product parts 22' are increasingly lifted off from one another and spread apart, with the result that each product part 22' comes to lie on one side of the rest 72. As soon as the open printed product 22 is located outside the region of action of the opening lug 118, the relevant clamp 20 is opened, with the result that the printed product 22 comes to butt in a straddling manner against the rest 72. A carry-along protrusion 120 moved in the arrow direction B carries along the deposited printed product 22 to the following feed path, where a further printed product is deposited on that which has already been deposited.

The apparatuses shown in the figures operate as follows. At the receiving location 24, printed products 22 unwound in imbricated formation S from the roll 84 are gripped individually at the bloom 90 by in each case one clamp 20 by virtue of the clamp mouth 20' being closed. The relevant clamp 20 is lifted as a result of the continued rotation of the drive wheel 48, as a result of which the printed product 22 is lifted in the upward direction from the following printed product 22. This means that the leading bloom 90 of said following printed product 22 is exposed so that it can be gripped by the following clamp 20. As a result of the rotation of the drive wheel 48, the clamp 20 passes into the region of action of the drive belt 50 and is lifted by the latter along the vertical section 34 into the first downwardly sloping section 36. Here, each clamp 20 is checked again in order to ascertain whether it has gripped a printed product 22 or not. If not, it is ejected and fed to the vertical section 42 via the bypassing section 54. Otherwise, as a result of the gravitational force, the clamp 20 moves freely along the first downwardly sloping section 36, possibly the curved section 38 and second downwardly sloping section 40, until it is positioned against the preceding clamp 20. Since the main conveying path 12 has a large storage capacity from the end of the vertical section 34 to the timing wheel 52, the clamps 20 can be released by the timing wheel 52 irrespective of the printed products 22 being received at the receiving location 24. The control device 94 determines to which processing station 26 or 26' the printed product released by the timing wheel 52 or 52' in each case should be fed, and sets the diverters 28 correspondingly. This makes it possible for any desired printed product 22 to be fed to any desired processing station. The printed products 22 directed to a feed path 14 are lined up in the correct sequence in the buffer-storage path and the operation of transferring the printed products 22 to the relevant processing station 26 or 26' can take place, again, irrespective of the printed products being received by the conveying means 10.

After the discharge of the printed products 22, the clamps 20 run back along the return path 16, 16' into the main conveying path 12 again, where, forming a supply in the vertical section 42 again, they run one onto the other and then, at the end of the vertical section 42, pass into the region of action of the drive wheel 48 again.

If the feed paths 14 are designed according to FIG. 4, all that is required in the imbricated formation S is for the printed products 22 to be arranged such that the fold 68 leads in relation to the bloom 90.

If the processing stations are devices for the collation, collection or insertion of the printed products, a plurality of apparatuses are preferably arranged one behind the other along the processing paths, as is shown in the figures.

If the processing stations are stacking devices, a single conveying means may possibly be sufficient.

For the sake of completeness, it should be mentioned that, instead of the unwinding device 78, it is possible to provide any other source for printed products, be this a feeder or a printing press.

It is, of course, also possible, instead of downwardly sloping paths, to provide drives for moving the clamps 20 forward.

What is claimed is:

1. An apparatus for supplying printed products to processing stations that processes printed products, comprising at least one main conveying path (12), a plurality of processing stations (26, 26'), a plurality of feed paths (14, 14'), a plurality of return paths (16, 16') and a plurality of mutually independent clamps (20), said at least one main conveying path transports in the conveying direction (F) the printed products (22), each of the printed products being retained by one of the clamps (20), said at least one main conveying path having a controlled diverter mechanism (28) at a transfer location that functions to divert the clamps with retained printed products to the feed paths (14, 14'), each feed path leading to a processing station (26, 26'), each feed path (14, 14') functions as a buffer-storage path in which, for intermediate storage, successive clamps (20) can assume a minimal spacing from one another or can butt against one another, and the feed paths (14, 14') are adjoined by return paths (16, 16') for the clamps (20) which have been emptied at the processing stations (26, 26') to be directed back to the main conveying path (12).

2. The apparatus as claimed in claim 1, wherein the main conveying path (12) comprises a continuous conveyor and said diverter mechanism includes a diverter for each feed path (14, 14').

3. The apparatus as claimed in claim 1 or 2, wherein the diverters (28) are arranged in a section (40) of the main conveying path (12), said section sloping downward in the conveying direction (F), and the feed paths (14, 14') slope downward in the direction of the processing stations (26, 26').

4. The apparatus as claimed in claim 3, wherein the feed paths (14, 14') run above the processing stations (26, 26') and the mouths (20') of the clamps (20) are directed downward, in order for the printed products (22) to be transported in a state in which they are retained in a hanging position.

5. The apparatus as claimed in claim 4, wherein the processing stations (26, 26') collect, collate or insert the printed products (22) and further comprise stationary processing paths (62), for the discharge of the printed products (22) to the processing paths (62).

6. The apparatus as claimed in claim 5, for the transfer of the printed products (22) to the processing paths (62), run in the vertical plane (98) and slope downward to the processing paths (62).

7. The apparatus as claimed in claim 1 or 2, which further comprises a second main conveying path (108) which is connected, via a connecting path (112) and further controlled diverters (110, 110'), to the first main conveying path (12) for the purpose of transferring clamps (20) provided with printed products (22) from the second main conveying path (108) into the first main conveying path (12).

8. The apparatus as claimed in claim 7, wherein the diverters (28) are arranged in a section (40) of the main conveying path (12), said section sloping downward in the conveying direction (F), and the feed paths (14, 14') slope downward in the direction of the processing stations (26, 26').

9. The apparatus as claimed in claim 7, wherein the feed paths (14, 14') run above the processing stations (26, 26') and the mouths (20') of the clamps (20) are directed downward, in order for the printed products (22) to be retained in a hanging position.

10. The apparatus as claimed in claim 9, wherein the processing stations (26, 26') collect, collate or insert the printed products (22) and further comprise stationary processing paths (62), for the discharge of the printed products (22) to the processing paths (62).

11. The apparatus as claimed in claim 10, for the transfer of the printed products (22) to the processing paths (62), run in the vertical plane (98) and slope downward to the processing paths (62).

12. The apparatus as claimed in claim 1 or 2, wherein the feed paths (14, 14') run above the processing stations (26, 26') and the mouths (20') of the clamps (20) are directed downward, in order for the printed products (22) to be retained in a hanging position.

13. The apparatus as claimed in claim 12, wherein the processing stations (26, 26') collect, collate or insert the printed products (22) and further comprise stationary processing paths (62), for the discharge of the printed products (22) to the processing paths (62).

14. The apparatus as claimed in claim 13, wherein the feed paths (14) run transversely with respect to the vertical plane (98) and slope downward and each feed path (14) is assigned, above the processing path (62), a controlled stop device (96) against which the clamps (20) are positioned for the discharge of the printed products (22).

15. The apparatus as claimed in claim 14, wherein the processing paths (62) are collecting paths having saddle-like rests (72), the clamps (20) are intended for retaining folded printed products (22) at their border (90), which is located opposite the fold (68), and in each case one opening device

(64) is arranged between the feed paths (14) and the rests (72), said opening device having a gripper (66) and a stationary opening lug (102), it being the case that the gripper (66) is intended for gripping the respective printed product (22) at the bottom fold (68), securing it and rotating it through at least approximately 180° about an axis (70), which runs at right angles to the vertical plane (98), and the opening lug (102) is intended for penetrating between the two product parts (22'), which are connected to one another by the fold (68), during rotation of the printed product (22) and for directing onto in each case one side of the rest (72) the product parts (22'), which have thus been lifted off from one another.

16. The apparatus as claimed in claim 13, wherein the feed path (14), for the transfer of the printed products (22) to the processing paths (62), run in the vertical plane (98) and slope downward to the processing paths (62).

17. The apparatus as claimed in claim 6, wherein the printed products comprise folded printed products, and said processing paths (62) comprise collecting paths which further comprise saddle-like rests (72), the clamps (20) retain the folded printed products (22) at their fold (68), and in each case one stationary opening lug (118) is arranged between the feed paths (14) and the saddle-like rests (72), said opening lug being intended for separating the two product parts (22'), which are connected to one another by the fold (68), and for directing onto in each case one side of the relevant rest (72) the product parts (22'), which have thus been lifted off from one another.

18. The apparatus as claimed in claim 1 or 2, wherein, upstream of the diverters (28), the main conveying path (12) further comprises a release device (52) which releases the clamps (20) at given points in time.

19. The apparatus as claimed in claim 18, which further comprises a second main conveying path (108) which is connected, via a connecting path (112) and further controlled diverters (110, 110'), to the first main conveying path (12) for the purpose of transferring clamps (20) provided with printed products (22) from the second main conveying path (108) into the first main conveying path (12).

20. The apparatus as claimed in claim 18, wherein the diverters (28) are arranged in a section (40) of the main conveying path (12), said section sloping downward in the conveying direction (F), and the feed paths (14, 14') slope downward in the direction of the processing stations (26, 26').

21. The apparatus as claimed in claim 18, wherein the feed paths (14, 14') run above the processing stations (26, 26') and the mouths (20') of the clamps (20) are directed downward, in order for the printed products (22) to be retained in a hanging position.

22. The apparatus as claimed in claim 21, wherein the processing stations (26, 26') collect, collate or insert the printed products (22) and further comprise stationary processing paths (62), for the discharge of the printed products (22) to the processing paths (62).

23. The apparatus as claimed in claim 22, for the transfer of the printed products (22) to the processing paths (62), run in the vertical plane (98) and slope downward to the processing paths (62).

24. The apparatus as claimed in claim 22, wherein the printed products comprise folded printed products, and said processing paths (62) comprise collecting paths which further comprise saddle-like rests (72), the clamps (20) folded printed products (22) at their fold (68), and in each case one stationary opening lug (118) is arranged between the feed paths (14) and the saddle-like rests (72), said opening lug being intended for separating the two product parts (22'), which are connected to one another by the fold (68), and for directing onto in each case one side of the relevant rest (72) the product parts (22'), which have thus been lifted off from one another.

25. The apparatus as claimed in claim 22, wherein the feed paths (14) run transversely with respect to the vertical plane (98) and slope downward and each feed path (14) is assigned, above the processing path (62), a controlled stop device (96) against which the clamps (20) are positioned for the discharge of the printed products (22).

26. The apparatus as claimed in claim 25, wherein the processing paths (62) are collecting paths having saddle-like rests (72), the clamps (20) are intended for retaining folded printed products (22) at their border (90), which is located opposite the fold (68), and in each case one opening device (64) is arranged between the feed paths (14) and the rests (72), said opening device having a gripper (66) and a stationary opening lug (102), it being the case that the gripper (66) is intended for gripping the respective printed product (22) at the bottom fold (68), securing it and rotating it through at least approximately 180° about an axis (70), which runs at right angles to the vertical plane (98), and the opening lug (102) is intended for penetrating between the two product parts (22'), which are connected to one another by the fold (68), during rotation of the printed product (22) and for directing onto in each case one side of the rest (72) the product parts (22'), which have thus been lifted off from one another.

* * * * *

UNITED STATES PATENT AND TRADEMARK OFFICE
CERTIFICATE OF CORRECTION

PATENT NO. : 6,003,859
DATED : December 21, 1999
INVENTOR(S) : Walter Reist

It is certified that error appears in the above-identified patent and that said Letters Patent is hereby corrected as shown below:

On the face of the Patent, insert

-- [30] Foreign Priority Application Data

Jul. 19, 1996 [SW] Switzerland.................... 1818/96 --

Under U.S. Patent Documents reference number "3,907,274," change "D'Aamato et al." to -- D'Amato et al. --

Claim 24, Col. 12, line 15, after "clamps (20)" insert -- retain the --.

Signed and Sealed this

Nineteenth Day of September, 2000

*Attest:*

Q. TODD DICKINSON

*Attesting Officer*

*Director of Patents and Trademarks*